(12) United States Patent
Park et al.

(10) Patent No.: US 9,576,729 B2
(45) Date of Patent: Feb. 21, 2017

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Kum Jin Park, Suwon-Si (KR); Chang Hak Choi, Suwon-si (KR); Chi Hwa Lee, Suwon-Si (KR); Jong Hoon Yoo, Suwon-Si (KR); Min Gi Sin, Suwon-Si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/673,100

(22) Filed: Mar. 30, 2015

(65) Prior Publication Data

US 2016/0104576 A1    Apr. 14, 2016

(30) Foreign Application Priority Data

Oct. 8, 2014    (KR) .......................... 10-2014-0136012

(51) Int. Cl.
| | |
|---|---|
| *C04B 35/00* | (2006.01) |
| *H01G 4/12* | (2006.01) |
| *H01G 4/008* | (2006.01) |
| *H01G 4/30* | (2006.01) |

(52) U.S. Cl.
CPC ............ *H01G 4/1227* (2013.01); *H01G 4/008* (2013.01); *H01G 4/30* (2013.01)

(58) Field of Classification Search
CPC ............................ C04B 35/468; C04B 35/4682

USPC .................................................. 501/137, 138
See application file for complete search history.

(56) References Cited

U.S. PATENT DOCUMENTS

| | | | | |
|---|---|---|---|---|
| 7,433,173 | B2 * | 10/2008 | Iwasaki et al. ...... | C04B 35/4682 361/321.4 |
| 2008/0266751 | A1 * | 10/2008 | Yamazaki et al. .. | C04B 35/4682 361/321.4 |
| 2013/0294008 | A1 | 11/2013 | Kim et al. | |
| 2016/0118188 | A1 * | 4/2016 | Wada ..................... | H01G 4/012 361/301.4 |

FOREIGN PATENT DOCUMENTS

| | | |
|---|---|---|
| JP | 2003-068559 A | 3/2003 |
| JP | 2005-026342 A | 1/2005 |
| JP | 2006-206362 A | 8/2006 |
| JP | 2006206362 A * | 8/2006 |
| KR | 1999-0075846 A | 10/1999 |
| KR | 10-2013-0124068 A | 11/2013 |

\* cited by examiner

*Primary Examiner* — Noah Wiese
(74) *Attorney, Agent, or Firm* — McDermott Will & Emery LLP (57) ABSTRACT

There is provided a multilayer ceramic electronic component including: a ceramic body in which internal electrodes and dielectric layers containing a barium titanate-based compound containing calcium (Ca) are alternately stacked; and external electrodes disposed on outer surfaces of the ceramic body and electrically connected to the internal electrodes. The dielectric layer includes interfacial portions adjacent to the internal electrodes and a central portion disposed between the interfacial portions, the interfacial portion having a calcium (Ca) concentration higher than that of the central portion.

18 Claims, 5 Drawing Sheets

MULTILAYER CERAMIC ELECTRONIC COMPONENT AND METHOD OF MANUFACTURING THE SAME

CROSS-REFERENCE TO RELATED APPLICATION

This application claims the priority and benefit of Korean Patent Application No. 10-2014-0136012 filed on Oct. 8, 2014, with the Korean Intellectual Property Office, the disclosure of which is incorporated herein by reference.

BACKGROUND

The present disclosure relates to a multilayer ceramic electronic component and a method of manufacturing the same.

Electronic components using a ceramic material, such as a capacitor, an inductor, a piezoelectric element, a varistor, a thermistor, or the like, include a ceramic body formed of the ceramic material, internal electrodes formed in the ceramic body, and external electrodes mounted on surfaces of the ceramic body so as to be connected to the internal electrodes.

Among such electronic components, a multilayer ceramic capacitor is manufactured by stacking cut sheets of paste for forming an internal electrode on which layers of a paste for forming a dielectric layer are disposed in a sheet method, a printing method, or the like, and sintering the stacked cut sheets of paste.

According to the related art, as a dielectric material used in a multilayer ceramic capacitor, or the like, a barium titanate ($BaTiO_3$)-based dielectric material has been commonly used.

As various functions of devices used in fields requiring high degrees of reliability are digitalized and demand therefor is increased, high degrees of reliability are also required in multilayer ceramic electronic components.

Meanwhile, in accordance with the development of multilayer ceramic electronic components, methods of implementing high degrees of capacitance and high degrees of reliability characteristics is emerging as a significant consideration.

RELATED ART DOCUMENT (Patent Document 1) Korean Patent Laid-Open Publication No. 1999-0075846

SUMMARY

An aspect of the present disclosure may provide a multilayer ceramic electronic component and a method of manufacturing the same.

According to an aspect of the present disclosure, a multilayer ceramic electronic component may include a ceramic body including dielectric layers and internal electrodes, and external electrodes connected to the internal electrodes, wherein interfacial portions of the dielectric layers adjacent to the internal electrodes have a calcium (Ca) content higher than a calcium (Ca) content of central portions of the dielectric layers between the interfacial portions, such that capacitance and reliability may be improved.

The interfacial portions may contain titanium and calcium, and a molar ratio of titanium and calcium contained in the interfacial portions may be 100:1 or more to 100:20 or less.

The central portions may contain titanium and calcium, and a molar ratio of titanium and calcium contained in the central portions may be more than 100:0 but 100:0.2 or less.

Alternatively, the central portions may not contain calcium.

According to another aspect of the present disclosure, a method of manufacturing a multilayer ceramic electronic component is provided. In the method, the multilayer ceramic capacitor may be formed so that dielectric layers include interfacial portions adjacent to internal electrodes and central portions disposed between the interfacial portions, the interfacial portions having a calcium (Ca) concentration higher than a calcium (Ca) concentration of the central portions.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 1:
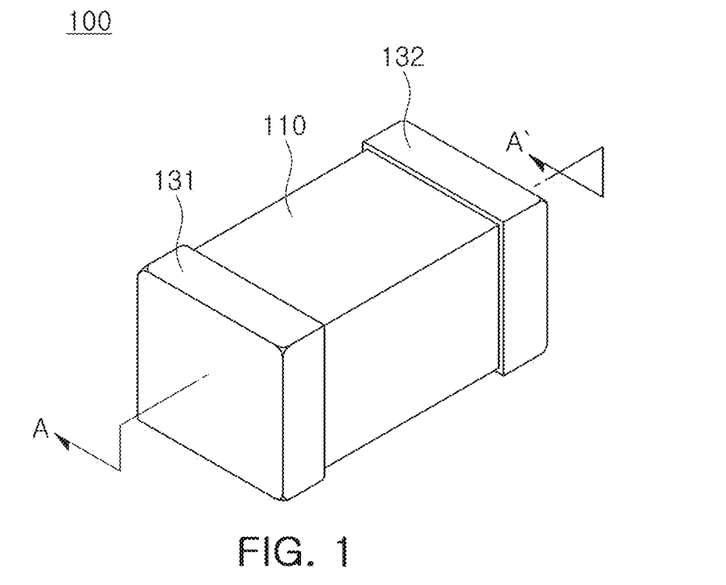
FIG. 1 is a perspective view showing a multilayer ceramic electronic component according to an exemplary embodiment of the present disclosure.
Figure 2:
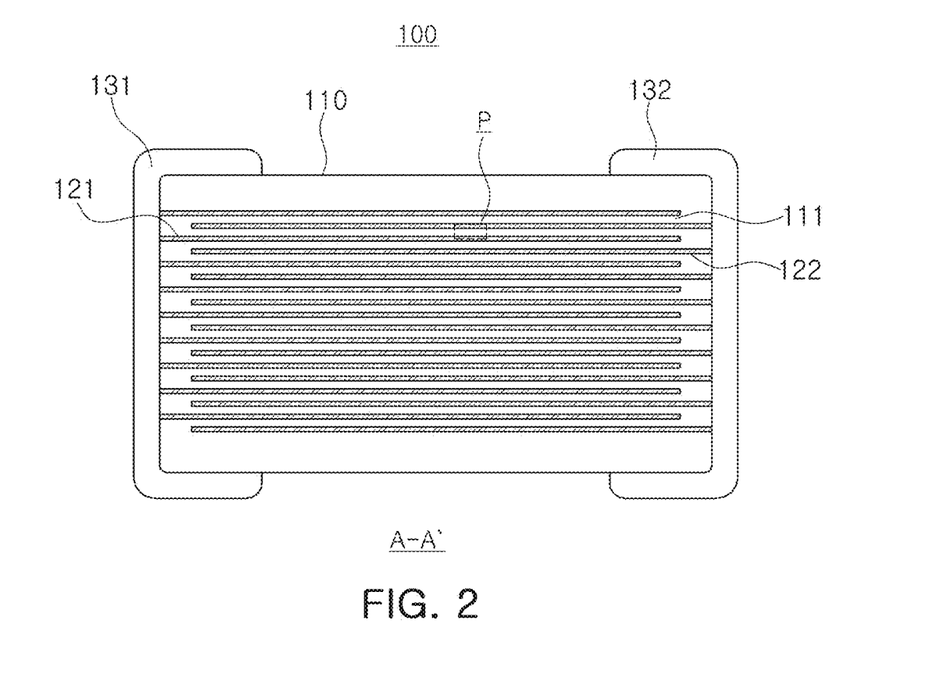
FIG. 2 is a cross-sectional view taken along line A-A' of FIG. 1.

FIG. 1 is a perspective view showing a multilayer ceramic electronic component 100 according to an exemplary embodiment of the present disclosure, and FIG. 2 is a cross-sectional view of the multilayer ceramic electronic component 100, taken along line A-A' of FIG. 1.

Referring to FIGS. 1 and 2, the multilayer ceramic electronic component 100 according to an exemplary embodiment of the present disclosure may include a ceramic body 110; internal electrodes 121 and 122 disposed in the ceramic body; and external electrodes 131 and 132 disposed on outer surfaces of the ceramic body.

The ceramic body 110 may include an active layer as a portion contributing to forming capacitance of the electronic component and upper and lower cover layers formed on upper and lower portions of the active layer as upper and lower margin parts, respectively. The active layer may include dielectric layers 111 and the internal electrodes 121 and 122 and be formed by stacking the dielectric layers 111 on which the internal electrodes 121 and 122 are printed.

In an exemplary embodiment of the present disclosure, a shape of the ceramic body 110 is not particularly limited, but may be substantially a hexahedral shape. A difference in a thickness is generated according to the sintering shrinkage of ceramic powder at the time of sintering a chip and the presence or absence of an internal electrode pattern, and edge parts of the ceramic body are polished, such that the ceramic body 110 does not have a perfect hexahedral shape but may have a shape substantially close to a hexahedral shape.

The internal electrodes 121 and 122 may be alternately stacked with the dielectric layers 111 and insulated from each other by the dielectric layer 111 interposed between the internal electrodes.

The internal electrodes 121 and 122 may include first and second internal electrodes 121 and 122, and the first and second internal electrodes may be alternately stacked on the dielectric layer.

A thickness and the number of stacked internal electrodes 121 and 122 may be determined depending on the use.

The internal electrodes 121 and 122 may contain nickel (Ni), copper (Cu), palladium (Pd), or an alloy thereof, but are not limited thereto.

A conductive material contained in the first and second internal electrodes 121 and 122 is not particularly limited, but nickel (Ni) may be used.

The dielectric layer 111 may contain barium titanate ($BaTiO_3$)-based power as ceramic powder having high permittivity, wherein the barium titanate ($BaTiO_3$)-based power may include pure barium titanate and a compound in which other addition elements are doped in Ba and Ti sites in barium titanate.

Figure 3:
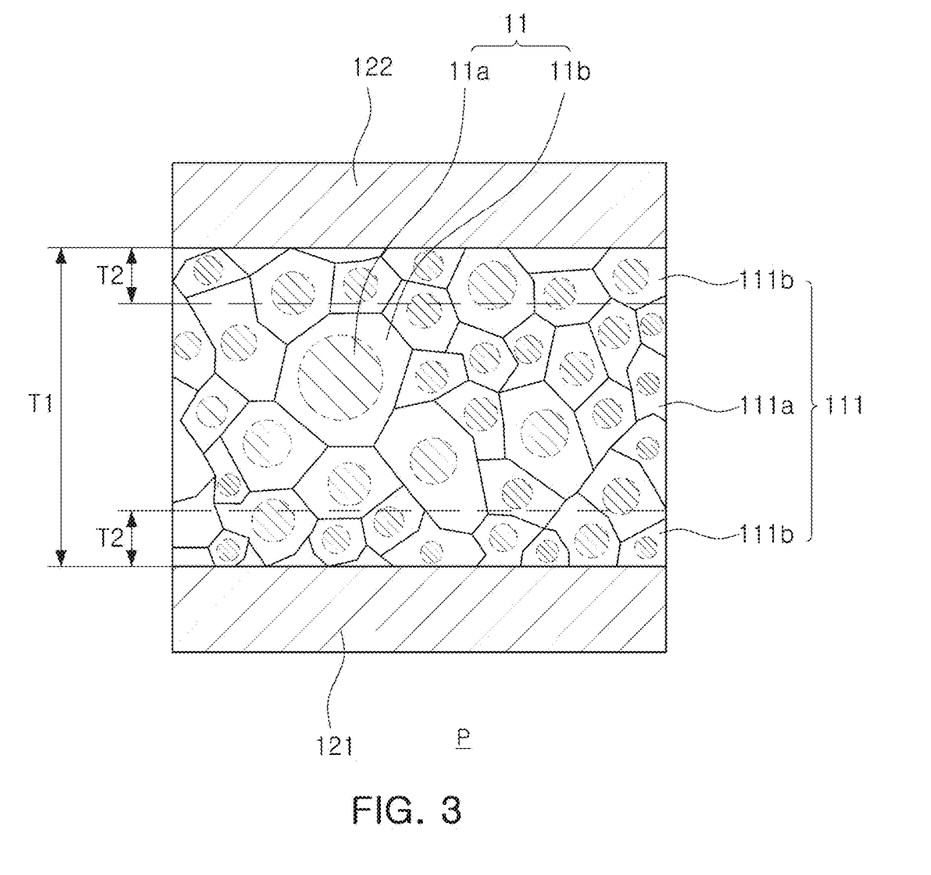
FIG. 3 is an enlarged view of the part P of FIG. 2.

FIG. 3 is an enlarged view of the part P of FIG. 2.

As shown in FIG. 3, the dielectric layer 111 may include interfacial portions 111b adjacent to the internal electrodes and a central portion 111a disposed between the interfacial portions 111b.

The interfacial portions 111b and the central portion 111a are not distinguished in the dielectric layer but may be formed integrally with each other and distinguished by distance from the internal electrodes.

According to an exemplary embodiment of the present disclosure, the interfacial portion 111b may be defined as a region of which a distance from an interface between the internal electrode and the dielectric layer is within 20% of a thickness of the dielectric layer.

A thickness t2 of the interfacial portion 111b may be 20% of the thickness t1 of the dielectric layer 111.

According to an exemplary embodiment of the present disclosure, the dielectric layer may contain calcium (Ca), wherein a calcium concentration of the dielectric layer is higher in the interfacial portion 111b as that in the central portion 111a.

Since $BaTiO_3$ used as a material of a dielectric layer may implement high permittivity but reduction resistance thereof is not good, in the case of thinning dielectric layers and internal electrodes, it may be difficult to secure reliability.

According to an exemplary embodiment of the present disclosure, in order to improve reduction resistance of the dielectric layer, the dielectric layer contains calcium doped-barium titanate ($Ba_{1-x}Ca_xTiO_3$, hereinafter, referred to as BCT).

However, in the case of using BCT as the material of the dielectric layer, permittivity may be decreased, and a dielectric loss (DF) may be large.

Therefore, according to an exemplary embodiment of the present disclosure, the dielectric layer contains BCT, but BCT is not uniformly contained in a thickness direction of the dielectric layer but is mainly distributed in the interfacial portion of the dielectric layer adjacent to the internal electrode.

Further, according to an exemplary embodiment of the present disclosure, the central portion 111a of the dielectric layer 111 may be formed of barium titanate-based powder that does not contain calcium, or even in the case in which calcium is contained in the central portion 111a, only a small amount of calcium is contained therein.

According to an exemplary embodiment of the present disclosure, BCT is mainly contained in the interfacial portion 111b of the dielectric layer 111, such that the interfacial portion 111b of the dielectric layer may have a calcium concentration higher than that of the central portion 111a thereof.

In an exemplary embodiment of the present disclosure, since the calcium doped-barium titanate ($Ba_{1-x}Ca_xTiO_3$, BCT) is not uniformly contained in the dielectric layer but is further contained in the interfacial portion 111b as compared to the central portion 111a, a multilayer ceramic electronic component of which a decrease in permittivity is prevented, the dielectric loss is decreased, and reliability is improved may be provided.

Further, insulation degradation generated due to a damage of dielectric layers while using a multilayer ceramic electronic component is mainly generated when oxygen vacancy are accumulated in an interfacial portion of the dielectric layers adjacent to internal electrodes. Therefore, in the case in which calcium, which is an additive ingredient improving reduction resistance and reliability of barium titanate is allowed to mainly exist in the interfacial portion a11b of the dielectric layer as in an exemplary embodiment of the present disclosure, high permittivity and a low dielectric loss are implemented, and reliability may be also be improved.

According to an exemplary embodiment of the present disclosure, a molar ratio of titanium (Ti) and calcium (Ca) contained in the interfacial portion 111b of the dielectric layer may be 100:1 or more but 100:20 or less.

In the case in which the molar ratio of the titanium and calcium contained in the interfacial portion 111b of the dielectric layer is less than 100:1, an effect of improving reliability of the multilayer ceramic electronic component by a BCT composition contained in the interfacial portion may not be exhibited.

In the case in which the molar ratio of the titanium and calcium contained in the interfacial portion 111b of the dielectric layer is less than 100:20, calcium may not be solid-solubilized in BCT but exist in another secondary phase. In this case, permittivity may be decreased.

According to an exemplary embodiment of the present disclosure, the central portion 111a of the dielectric layer may be formed of a barium titanate-based dielectric material that does not contain calcium.

According to an exemplary embodiment of the present disclosure, a molar ratio of titanium (Ti) and calcium (Ca) contained in the central portion 111a of the dielectric layer may be more than 100:0 but 100:0.2 or less.

In the case in which the molar ratio of titanium and calcium contained in the central portion 111a of the dielectric layer is more than 100:0.2, permittivity may be decreased, and the dielectric loss may be increased.

According to an exemplary embodiment of the present disclosure, the dielectric layer 111 having a concentration gradient of calcium in the thickness direction may be formed using an additive of internal electrodes.

Although described again in a method of manufacturing a multilayer ceramic electronic component to be described below, the dielectric layers and the internal electrodes may be formed by applying an internal electrode paste onto ceramic green sheets forming the dielectric layer and then sintering a multilayer body formed by stacking the internal electrode paste applied ceramic green sheets.

According to an exemplary embodiment of the present disclosure, the internal electrode paste for forming the internal electrodes may contain a ceramic additive containing a compound (BCT) represented by $Ba_{1-x}Ca_xTiO_3$, such that a calcium content of the interfacial portion of the dielectric layer adjacent to the internal electrode may be higher than that of the central portion of the dielectric layer.

Here, x may satisfy $0.01 \leq x \leq 0.2$.

BCT contained in the internal electrode paste as the additive may be released from the internal electrode during a sintering process of the multilayer body including the ceramic green sheet onto which the internal electrode paste is applied, and move to the ceramic green sheet to thereby form the dielectric layer. In this case, BCT may be disposed in the interfacial portion of the dielectric layer adjacent to the internal electrode.

According to an exemplary embodiment of the present disclosure, the ceramic additive contained in the internal electrode paste contains BCT, which is the barium titanate-based compound doped with calcium, calcium may be uniformly distributed in the interface of the dielectric layer as compared to the case of adding calcium to an internal electrode paste in a form of a separate additive such as CaCO3 or Ba—Ca—Si(BCS) or the case of adding a ceramic additive of which a surface is coated with calcium to an internal electrode paste.

In the case in which calcium is not doped in a barium titanate-based compound but separately exists in a ceramic additive, during a sintering process of internal electrodes, calcium may react to form a secondary phase.

However, in the case of using BCT, which was doped with calcium, as the ceramic additive having a sintering temperature higher than that of the internal electrode paste as in an exemplary embodiment of the present disclosure, formation of a secondary phase of calcium may be suppressed during a sintering process of internal electrodes. Further, the ceramic additive containing BCT that is released to an interface of the internal electrode and the ceramic green sheet may form the dielectric layer together with a compound contained in the ceramic green sheet, such that the dielectric loss of the dielectric layer may be decreased, and reliability may be improved.

According to an exemplary embodiment of the present disclosure, the dielectric layer may contain dielectric grains 11, wherein the dielectric grain may have a core-shell structure including a core portion 11a and a shell portion 11b enclosing the core portion, as shown in FIG. 3.

According to an exemplary embodiment of the present disclosure, in the dielectric grain contained in the interfacial portion, a calcium content may be higher in the shell portion than that in the core portion.

As described above, in the case in which the ceramic additive containing BCT contained in the internal electrode paste is released to the interface with the ceramic green sheet in the sintering process to form the dielectric layer, BCT contained in the ceramic additive may form the shell portion of the dielectric grain enclosing barium titanate contained in the ceramic green sheet.

Therefore, according to an exemplary embodiment of the present disclosure, the shell portion of the dielectric grain contained in the interfacial portion 111b may contain the compound represented by $Ba_{1-x}Ca_xTiO_3$ ($0.01 \leq x \leq 0.2$), and the calcium content may be higher in the shell portion of the dielectric grain contained in the interfacial portion of the dielectric layer than that in the core portion thereof.

The ceramic additive containing BCT that is not released from the internal electrode paste during the sintering process of the internal electrode paste and the ceramic green sheet may remain in the internal electrode after sintering.

According to an exemplary embodiment of the present disclosure, an average particle diameter of the ceramic additive contained in the internal electrode after sintering may be 1 to 200 nm.

Referring to FIGS. 1 and 2 again, the upper and lower cover layers included in the ceramic body may be formed by stacking a single or two or more dielectric layers on upper and lower surfaces of the active layer in a vertical direction, respectively, and serve to prevent the internal electrodes 121 and 122 from being damaged by physical or chemical stress.

The first and second external electrodes 131 and 132 may be disposed on both end portions of the ceramic body 110, respectively, and electrically connected to the exposed end portions of the first and second internal electrodes 121 and 122, respectively, thereby configuring a capacitor circuit.

Although not limited, the external electrodes may contain copper (Cu) as a conductive material. Although not limited, the external electrodes 131 and 132 may further contain glass and be formed by applying an external electrode paste containing the conductive material and the glass. The glass may be contained in the external electrode paste in a glass frit form.

The external electrodes may be formed by sintering the external electrode paste.

According to an exemplary embodiment of the present disclosure, the multilayer ceramic electronic component having high capacitance, a low dielectric loss, and excellent reliability may be provided by including the dielectric layers of which the calcium concentrations are different in the thickness direction.

Figure 4:
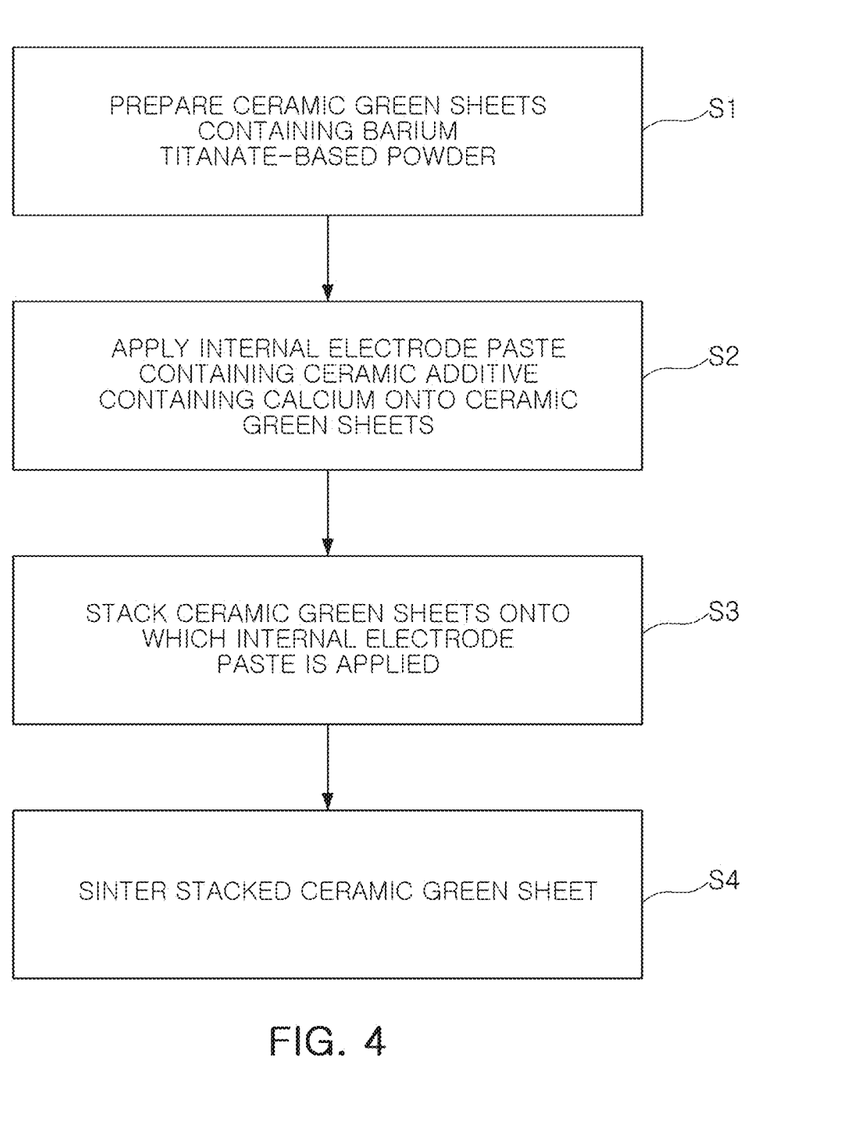
FIG. 4 is a flow chart showing a method of manufacturing a multilayer ceramic electronic component according to another exemplary embodiment of the present disclosure.

FIG. 4 is a flow chart showing a method of manufacturing a multilayer ceramic electronic component according to another exemplary embodiment of the present disclosure.

Referring to FIG. 4, the method of manufacturing a multilayer ceramic electronic component according to another exemplary embodiment of the present disclosure may include: preparing a plurality of ceramic green sheets containing barium titanate-based powder (S1); applying an internal electrode paste containing a ceramic additive containing calcium onto the ceramic green sheets (S2); stacking the ceramic green sheets on which the internal electrode paste is applied to form a multilayer body (S3); and sintering the multilayer body to prepare a ceramic body (S4).

The preparing of the plurality of ceramic green sheets (S1) may be performed by applying and drying slurry containing the barium titanate-based powder onto a carrier film.

It is preferable that the ceramic green sheet does not contain calcium (Ca) or contains calcium (Ca) at a content of 0.2 mol or less based on 100 mol of titanium (Ti) even in the case in which the ceramic green sheet contains calcium.

The applying of the internal electrode paste (S2) may be performed by printing the internal electrode paste on the ceramic green sheets, but a method of forming internal electrode patterns is not limited thereto.

The internal electrode paste is not limited to an electrode material but may contain nickel (Ni), copper (Cu), palladium (Pd), or an alloy thereof.

According to an exemplary embodiment of the present disclosure, the internal electrode paste may contain a ceramic additive, wherein the ceramic additive contains a compound represented by $Ba_{1-x}Ca_xTiO_3 (0.01 \leq x \leq 0.2)$ (BCT).

According to an exemplary embodiment of the present disclosure, an average particle diameter of the ceramic additive may be 1 nm to 50 nm.

In the case in which the particle diameter of the ceramic additive is less than 1 nm, an effect of suppressing necking between conductive materials (for example, nickel) contained in the internal electrode paste may be insufficient during the sintering process, such that connectivity of internal electrodes may be deteriorated.

Further, in which the particle diameter of the ceramic additive is more than 50 nm, the ceramic additive contained in the internal electrode paste may be rapidly released to interfaces between the internal electrodes and the ceramic green sheets during the sintering process, such that the ceramic additive may not properly perform a function of suppressing the sintering of the internal electrodes, thereby deteriorating connectivity of the internal electrodes.

In the case in which the particle diameter of the ceramic additive is 1 nm to 50 nm, connectivity of the internal electrodes may be improved, and accordingly, dielectric properties of the multilayer ceramic electronic component may be improved.

The ceramic additive that is not released to the interfaces during a sintering process may remain in the internal electrodes, and the ceramic additive remaining in the internal electrodes after sintering may have a particle diameter of 1 to 200 nm.

Next, the multilayer body may be formed by stacking the ceramic green sheets on which the internal electrode patterns are formed (S3). Further, in order to form upper and lower cover layers, the ceramic green sheets on which the internal electrode patterns are not formed may be stacked on upper and lower portions of the ceramic green sheet multilayer body in which the internal electrode patterns are formed.

Then, the ceramic body including the internal electrodes and dielectric layers may be formed by sintering the multilayer body (S4).

According to an exemplary embodiment of the present disclosure, the method of manufacturing a multilayer ceramic electronic component may further include, before the sintering of the multilayer body, pressing the multilayer body and cutting the pressed multilayer body into an individual chip form so that one ends of the internal electrode patterns are alternately exposed to cutting surfaces.

According to an exemplary embodiment of the present disclosure, the ceramic additive contained in the internal electrode paste may be released to the interface of the ceramic green sheet during a sintering process of the multilayer body, thereby forming the dielectric layer together with the ceramic green sheet.

Therefore, an interfacial portion of the dielectric layer may have a calcium (Ca) concentration higher than that of a central portion thereof.

According to an exemplary embodiment of the present disclosure, the ceramic additive contained in the internal electrode paste may be smoothly released to the interface using a difference in sintering properties between the electrode material and the ceramic additive contained in the internal electrode by rapidly increasing a temperature in a predetermined region of the sintering process.

Figure 5:
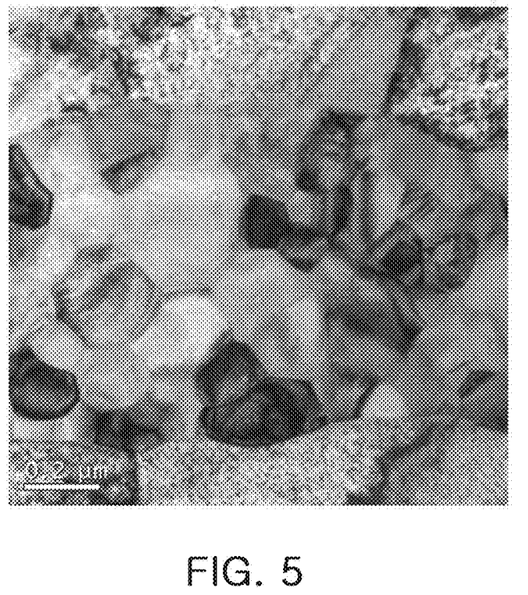
FIG. 5 is a transmission electronic microscope (TEM) photograph obtained by cutting a multilayer body after completing the sintering to observe cross sections of internal electrodes and dielectric layers.

FIG. 5 is a transmission electronic microscope (TEM) photograph obtained by cutting the multilayer body after completing the sintering to observe cross sections of internal electrodes and dielectric layers.

The ceramic additive contained in the internal electrode paste may be released to the interface between the internal electrode and the dielectric layer during the sintering, and referring to FIG. 5, BCT contained in the ceramic additive was absorbed in the shell portion of the dielectric grain contained in the dielectric layer to thereby form the dielectric layer after the sintering was completed.

Thereafter, external electrodes may be formed by applying an external electrode paste on an outer surface of the ceramic body. Application of the external electrode paste may be performed by dipping the ceramic body in the external electrode paste, but is not limited thereto.

According to an exemplary embodiment of the present disclosure, the external electrode paste may contain nickel (Ni), copper (Cu), palladium (Pd), gold (Au), silver (Ag), or an alloy thereof, but the present disclosure is not limited thereto.

The external electrodes may be formed by sintering the external electrode paste applied onto the ceramic body.

Among descriptions of the method of manufacturing a multilayer ceramic electronic component according to the present exemplary embodiment, a description overlapped with that of the above-mentioned multilayer ceramic electronic component according to an exemplary embodiment of the present disclosure will be omitted.

Experimental Example

Inventive Example 1

An internal electrode paste containing BCT powder doped with 10% calcium (Ca) (that is, $Ba_{0.9}Ca_{0.1}TiO_3$) as a ceramic additive was prepared. Meanwhile, after adding a sintering additive, a binder, and an organic solvent such as ethanol, or the like, to dielectric raw material powder containing barium titanate ($BaTiO_3$) powder and wet-mixing with each other to prepare ceramic slurry, ceramic green sheets were formed by applying and drying the ceramic slurry onto a carrier film.

Next, after printing the internal electrode paste containing the BCT powder as the ceramic additive on the ceramic green sheets, a multilayer body was formed by stacking the ceramic green sheets on which internal electrode patterns were printed, followed by compressing and cutting the multilayer body.

Then, after heating cut multilayer body to remove the binder, the multilayer body was sintered at a high temperature under reduction atmosphere, thereby forming a ceramic body. During the sintering, the BCT powder (ceramic additive) contained in the internal electrode paste was allowed to be released to interfaces between internal electrodes and dielectric layers in accordance with the internal electrode sintering by rapidly raising a temperature at a predetermined region, and after the BCT powder was released, the BCT powder released to interfaces between the internal electrodes and ceramic green sheets was allowed not to be diffused in a central portion of the dielectric layer.

External electrodes connected to the internal electrodes were formed by applying and sintering an external electrode paste containing glass frit and copper on both end surfaces of the ceramic body manufactured as described above.

Comparative Example 1

An internal electrode paste containing $BaTiO_3$ (hereinafter, referred to as "BT") powder that was not doped with calcium (Ca) as a ceramic additive was prepared. Other conditions were the same as those in Inventive Example 1 except for mixing the BT powder to the internal electrode paste as the ceramic additive instead of the BCT powder.

Comparative Example 2

Ceramic green sheets were manufactured using BCT powder that was doped with 3% calcium (Ca) as dielectric raw material powder. Other conditions were the same as those in Comparative Example 1.

Figure 6A:
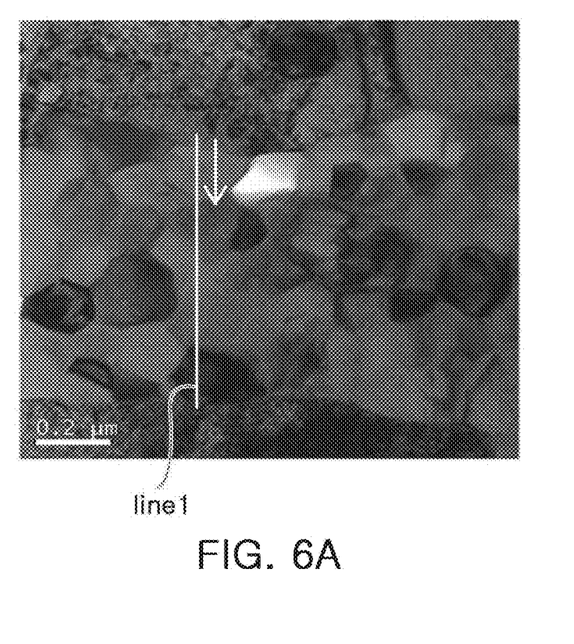
FIG. 6A is a transmission electronic microscope (TEM) photograph obtained by cutting a multilayer ceramic electronic component manufactured according to Inventive Example 1 of the present disclosure to observe cross sections of internal electrodes and dielectric layers.
Figure 6B:
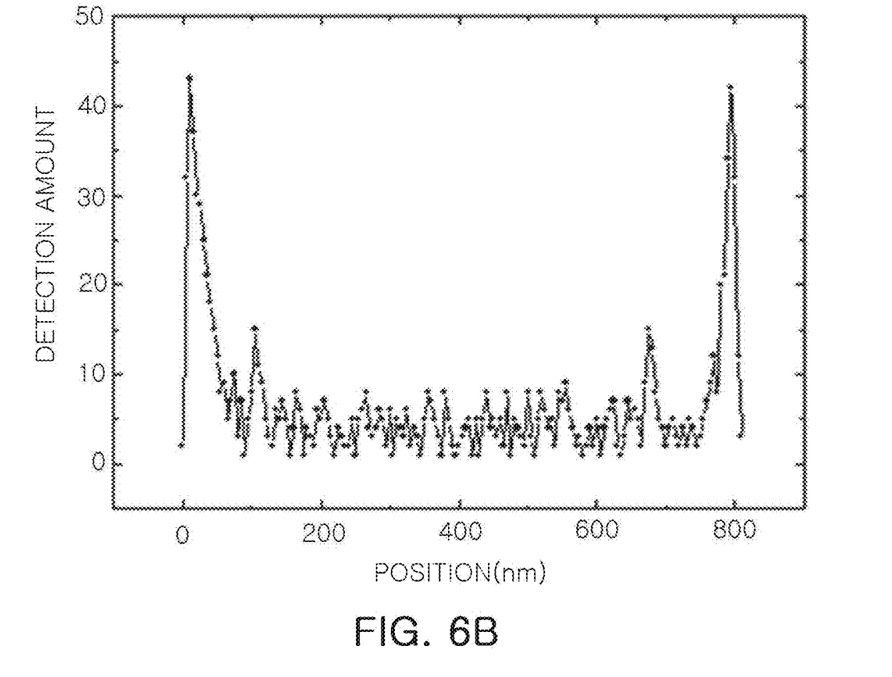
FIG. 6B is a graph showing energy dispersive spectroscopy (EDS) line profile analysis results indicating a detection amount of calcium (Ca) by analyzing a line 1 region of FIG. 6A in an arrow direction.

FIG. 6A is a transmission electronic microscope (TEM) photograph obtained by cutting a multilayer ceramic electronic component manufactured according to Inventive Example 1 of the present disclosure to observe cross sections of internal electrodes and dielectric layers, and FIG. 6B is a graph showing energy dispersive spectroscopy (EDS) line profile analysis results indicating a detection amount of calcium (Ca) by analyzing a line 1 region of FIG. 6A in an arrow direction. As shown in FIG. 6B, in the dielectric layer of the multilayer ceramic electronic component according to Inventive Example 1, it may be confirmed that a large amount of calcium (Ca) was detected in an interfacial portion adjacent to the internal electrode, but a small amount of calcium (Ca) was detected in the central portion of the dielectric layer.

The following Table 1 shows data obtained by measuring permittivity (relative permittivity), dielectric loss (DF), and break-down voltage (BDV) characteristics of the multilayer ceramic electronic components manufactured according to Inventive Example 1 and Comparative Examples 1 and 2.

Room-temperature permittivity and dielectric loss were measured at 1 KHz and 1V using Agilent 4284A. The BDV was measured using Keithley meter, and while applying a voltage which was swept from 0V to 1.00000V, a voltage value at a moment at which a current value was 10 mA was measured as the BDV value.

TABLE 1

| Sample | Permittivity | DF (%) | BDV (V) |
| --- | --- | --- | --- |
| Inventive Example 1 | 3621 | 4.59 | 69.25 |
| Comparative Example 1 | 3520 | 4.2 | 61.36 |
| Comparative Example 2 | 3608 | 4.93 | 68.83 |

Referring to Table 1, it may be confirmed that in the case of Inventive Example 1 in which the calcium (Ca) content in the interfacial portion of the dielectric layer adjacent to the internal electrode was high, permittivity was high as compared to Comparative Example 1 in which the dielectric layer did not contain calcium and Comparative Example 2 in which the overall dielectric layer contained calcium, such that capacitance of the multilayer ceramic electronic component was increased.

Further, in the case of Inventive Example 1, the dielectric loss (DF) was decreased as compared to the case in which the overall dielectric layer contained calcium (Comparative Example 2).

In addition, it may be confirmed that in Inventive Example 1, the breakdown voltage was improved as compared to the case in which the dielectric layer did not contain calcium (Comparative Example 1) or the case in which the overall dielectric layer contained calcium (Comparative Example 2).

As set forth above, according to exemplary embodiments of the present disclosure, the multilayer ceramic electronic component of which capacitance is increased and reliability is improved, and the method of manufacturing the same may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body in which dielectric layers containing a barium titanate-based compound containing calcium (Ca) and internal electrodes are alternately stacked; and
external electrodes disposed on outer surfaces of the ceramic body and electrically connected to the internal electrodes,
wherein the dielectric layer includes interfacial portions adjacent to the internal electrodes and central portions disposed between the interfacial portions, the interfacial portions having a calcium (Ca) concentration higher than a calcium concentration of the central portions, and
the internal electrodes contain a ceramic additive containing calcium.

2. The multilayer ceramic electronic component of claim 1, wherein the interfacial portions contain titanium and calcium, and a molar ratio of titanium and calcium contained in the interfacial portions is 100:1 or more to 100:20 or less.

3. The multilayer ceramic electronic component of claim 1, wherein the central portion contains titanium and calcium, and a molar ratio of titanium and calcium contained in the central portion is more than 100:0 to 100:0.2 or less.

4. The multilayer ceramic electronic component of claim 1, wherein the central portions do not contain calcium.

5. The multilayer ceramic electronic component of claim 1, wherein a thickness of the interfacial portions is 20% of a thickness of the dielectric layers.

6. The multilayer ceramic electronic component of claim 1, wherein dielectric grains contained in the interfacial portions have a core-shell structure, and shell portions of the dielectric grains contained in the interfacial portions have a calcium content higher than a calcium content of core portions.

7. The multilayer ceramic electronic component of claim 6, wherein the shell portions of the dielectric grains of the interfacial portions contain a compound represented by $Ba_{1-x}Ca_xTiO_3$, x satisfying $0.01 \leq x \leq 0.2$.

8. The multilayer ceramic electronic component of claim 1, wherein the ceramic additive contains a compound represented by $Ba_{1-x}Ca_xTiO_3$, x satisfying $0.01 \leq x \leq 0.2$.

9. The multilayer ceramic electronic component of claim 1, wherein the ceramic additive contained in the internal electrodes has an average particle diameter of 1 to 200 nm.

10. A method of manufacturing a multilayer ceramic electronic component, the method comprising:
preparing ceramic green sheets containing barium titanate-based powder;
applying an internal electrode paste containing a ceramic additive containing calcium to the ceramic green sheets;
stacking the ceramic green sheets to which the internal electrode paste is applied; and
sintering the stacked ceramic green sheets to form a ceramic body including internal electrodes and dielectric layers,
wherein the dielectric layers include interfacial portions adjacent to the internal electrodes and central portions disposed between the interfacial portions, the interfacial portions having a calcium (Ca) concentration higher than a calcium concentration of the central portions.

11. The method of claim 10, wherein the ceramic additive contains a compound represented by $Ba_{1-x}Ca_xTiO_3$, x satisfying $0.01 \leq x \leq 0.2$.

12. The method of claim 10, wherein the ceramic additive has an average particle diameter of 1 to 50 nm.

13. The method of claim 10, wherein the interfacial portion contains titanium and calcium, and a molar ratio of titanium and calcium contained in the interfacial portion is 100:1 or more but 100:20 or less.

14. The method of claim 10, wherein the central portions contain titanium and calcium, and a molar ratio of titanium and calcium contained in the central portions is more than 100:0 to 100:0.2 or less.

15. The method of claim 10, wherein the central portions do not contain calcium.

16. The method of claim 10, wherein a thickness of the interfacial portion is 20% of a thickness of the dielectric layer.

17. The method of claim 10, wherein dielectric grains contained in the interfacial portions have a core-shell structure, and shell portions of the dielectric grains contained in the interfacial portions have a calcium content higher than a calcium content of core portions.

18. The method of claim 17, wherein the shell portions of the dielectric grains contained in the interfacial portions contain a compound represented by $Ba_{1-x}Ca_xTiO_3$, x satisfying $0.01 \leq x \leq 0.2$.

* * * * *